Feb. 11, 1941. J. WEIL 2,231,234
BRUSH
Filed Dec. 29, 1937
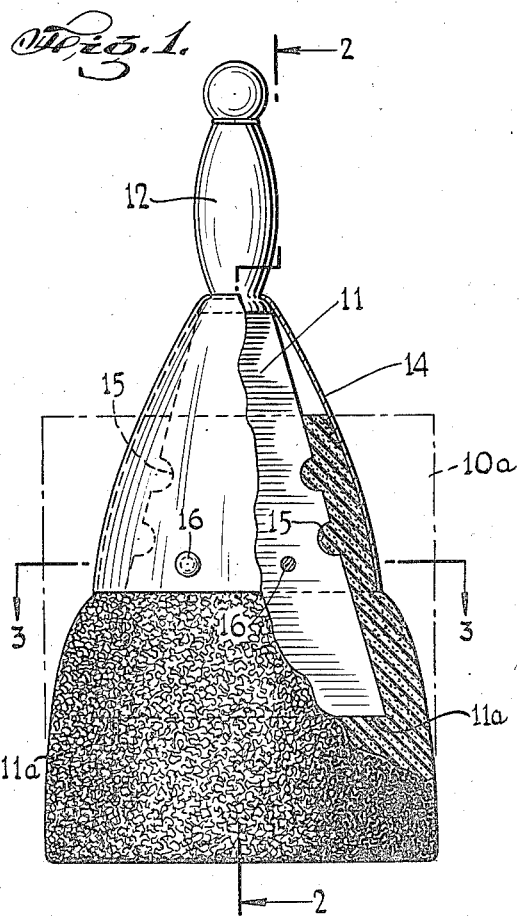
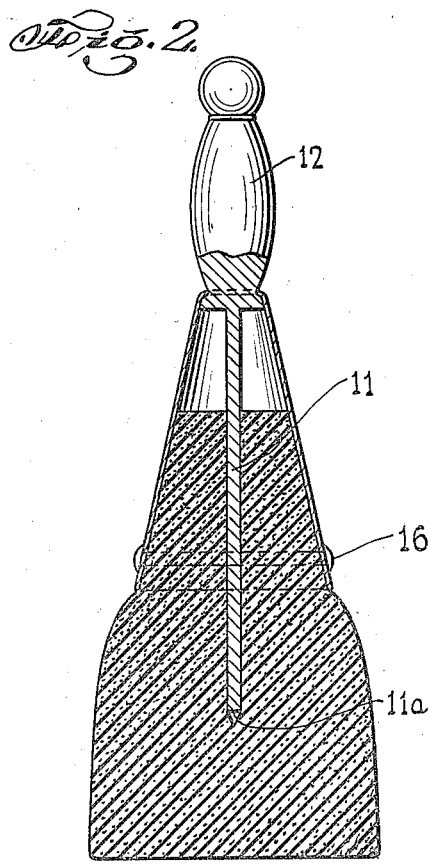
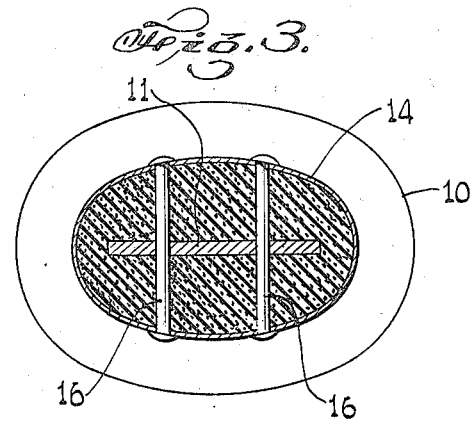
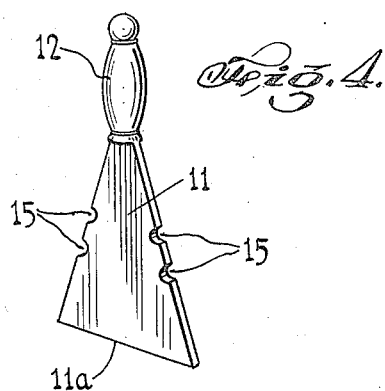
INVENTOR
Joseph Weil
BY
ATTORNEY Patented Feb. 11, 1941

2,231,234

UNITED STATES PATENT OFFICE 2,231,234

BRUSH

Joseph Weil, Brooklyn, N. Y.

Application December 29, 1937, Serial No. 182,198

2 Claims. (Cl. 15—244)

This invention relates generally to brushes. More particularly, my invention relates to a novel construction of the type of brushes known as whiskbrooms.

One of the objects of my invention is to provide a whiskbroom of the character described, employing resilient rubber as the brushing element, which shall comprise relatively few and simple parts, which shall be relatively inexpensive to manufacture, easy to assemble and which at the same time, shall be highly efficient for the purposes intended.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible embodiments of this invention, Fig. 1 is an elevational view, partly sectional, of a whiskbroom constructed in accordance with my invention.

Fig. 2 is a cross-sectional view taken substantially on the line 2—2 of Fig. 1.

Fig. 3 is a cross-sectional view taken substantially on the line 3—3 of Fig. 1; and Fig. 4 is a perspective view of reduced size illustrating one of the elements of my invention illustrated in Fig. 1.

Referring now in detail to the drawing, I have disclosed a whiskbroom constructed in accordance with my invention and comprising a block of sponge rubber 10 or any other suitable rubber material may be employed and which may be of any desired cross-sectional contour, such as, for example, rectangular or the oval shape illustrated in Fig. 3. Into this block of sponge rubber 10 there is adapted to be inserted a reinforcing or stiffening member 11 which may be made of any suitable rigid or semi-rigid material, such as hard rubber, fiber, metal, wood or plastic composition. The member 11 may be positioned or embedded within the sponge rubber block 10 by forcing the same into said block from the top thereof downwardly, or a suitable slit of sufficient width to accommodate the member 11, may be provided within the block 10 centrally disposed, to facilitate the insertion of the said member 11. The stiffening member 11 may have integrally attached thereto at the upper end thereof a handle portion 12, or, if desired, the member 11 and the handle 12 may be made of independent parts and subsequently joined in any suitable manner well known in the art.

The member 11 and handle 12 may also be constructed of rubber and the embedded portion thereof may be cemented or otherwise attached to the surrounding material of the rubber block 10.

If desired, the binder member 14 may also be made of rubber to provide an all rubber whiskbroom.

After the member 11 has been suitably positioned within the block 10, a binder 14 of any suitable material such as sheet metal, cloth, or plastic composition is caused to encircle and compress a portion of the sponge rubber of the block 10, compressing the same from its original dotted line position 10a (Fig. 1) to that as shown in the drawing. This action of compressing the sponge rubber, as above described, will cause the said rubber to frictionally surround and confine the portion of the said member 11 adjacent said compressed rubber. To insure the retention of the member 11 within the block of rubber 10, the said member 10 is preferably constructed of substantially triangular shape as shown in Figs. 1 and 4. Notches 15 may be provided in opposite edges of member 11, which are adapted to receive therein the material of the sponge rubber when it is compressed by the member 14 to hold the member 11 in place. To retain the member 14 in position a pair of rivets 16 or other suitable clamping members may be provided which extend through the material of the sponge rubber and pass through the member 11, as clearly shown in Figs. 2 and 3.

It is noted that the member 11, when inserted in the block 10, extends downwardly to a predetermined distance, leaving a space between the bottom edge 11a thereof and the bottom edge of block 10, such distance being sufficient to permit useful operation of the whiskbroom.

In operation, the relatively rigid member 11 will serve to add rigidity to the whiskbroom, which might otherwise be too resilient for efficient operation.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a whiskbroom construction, a block of sponge rubber, a flat relatively rigid stiffening member embedded in said sponge rubber, a binding member compressing a portion of said block of sponge rubber around said stiffening member to prevent withdrawal of said stiffening member from said block, notches so disposed in the edges of said stiffening member as to have compressed portions of the sponge rubber forced into said notches by said binding member to aid in holding the same captive with said block of sponge rubber, and a handle attached to said stiffening member.

2. A cleaning implement comprising a block of sponge rubber having a freely flexible lower portion terminating in an elongated surface, a relatively rigid stiffening member having side edges tapering upwardly embedded in said block with a base substantially parallel to the longer dimension of said elongated surface and spaced a substantial distance above said surface, the upper portion of said stiffening member projecting above said block and associated with a handle, and a binding member of flat material having its upper end encircling and anchored to the lower portion of said handle against displacement longitudinally of said handle and having its intermediate portion and lower end encircling and concealing the upper portion of said block and compressing said block about the said upwardly tapering edges of said stiffening member to prevent upward withdrawal of said stiffening member from said block.

JOSEPH WEIL.